Figure 1:
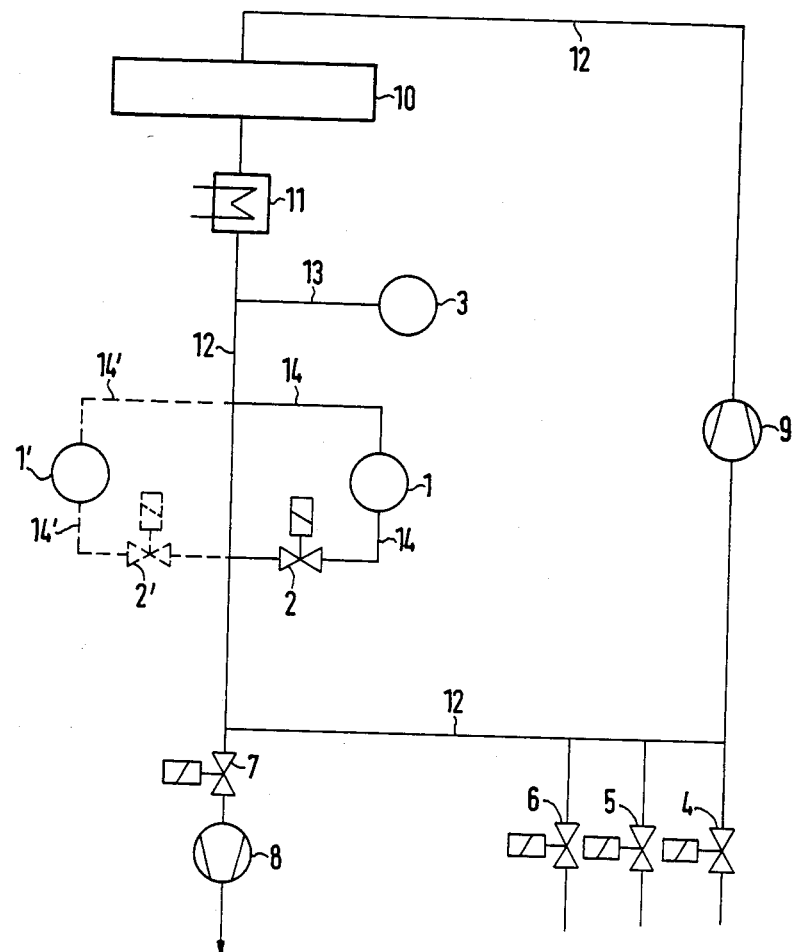

United States Patent [19]

Schramm

[11] Patent Number: 4,803,693

[45] Date of Patent: Feb. 7, 1989

[54] DEVICE FOR THE PREPARATION OF A GAS MIXTURE

[75] Inventor: Herbert Schramm, Höchstadt, Fed. Rep. of Germany

[73] Assignee: Siemens Aktiengesellschaft, Berlin and Munich, Fed. Rep. of Germany

[21] Appl. No.: 103,408

[22] Filed: Sep. 30, 1987

[30] Foreign Application Priority Data

Sep. 30, 1986 [DE] Fed. Rep. of Germany ....... 3633201
Oct. 13, 1986 [DE] Fed. Rep. of Germany ....... 3634867

[51] Int. Cl.⁴ .............................................. H01S 3/22
[52] U.S. Cl. ...................................... 372/58; 372/59; 372/37; 372/38
[58] Field of Search ...................... 372/59, 58, 55, 37, 372/38

[56] References Cited

U.S. PATENT DOCUMENTS

| 3,982,200 | 9/1976 | Hoag | 372/55 |
| 4,502,145 | 2/1985 | Allen et al. | 372/38 |
| 4,722,090 | 1/1988 | Haruta et al. | 372/59 |

FOREIGN PATENT DOCUMENTS 1427855 12/1964 France .
1278639  6/1972 United Kingdom .
1449056  9/1976 United Kingdom .

OTHER PUBLICATIONS

Publication "Laser und Optoelektronik", No. 2/1985.
Publication "Excimer Lasers with Magnetic Switch Control" EMG 100 MSC Series, EMG 200 MSC Series.
Patent Abstracts of Japan, vol. 8, No. 247, Nov. 1984.
IBM Technical Disclosure Bulletin, vol. 25, No. 3B, Aug. 1982, pp. 1492–1493.

Primary Examiner—Léon Scott, Jr.
Attorney, Agent, or Firm—Herbert L. Lerner; Laurence A. Greenberg

[57] ABSTRACT

A device for the preparation of a gas mixture includes a closed circuit. Mixture components of a gas mixture are fed with greatly differing partial pressures ranging from low to highest partial pressures to the closed circuit. The gas mixture is circulated in the closed circuit. At least one of the mixture components with low partial pressure is replenished at increasingly shorter intervals. The gas mixture is completely exchanged when a given minimal length of the intervals is reached. At least one branch parallel to a section of the closed circuit conducts the gas mixture substantially completely free of flow losses. The at least one branch includes a magnetic valve, a differential pressure sensor in series with the magnetic valve having a total measuring range corresponding to the low partial pressures, the differential pressure sensor controlling the replenishment of the mixture components having the low partial pressure exclusively while the magnetic valve is closed, and an absolute pressure sensor controlling at least the replenishment of the mixture component having the highest partial pressure.

8 Claims, 1 Drawing Sheet

DEVICE FOR THE PREPARATION OF A GAS MIXTURE

The invention relates to a device for the preparation of a gas mixture in a closed circuit, especially a circulated gas mixture fed across the discharge gap of a gas laser, under a total pressure of 5,000 hPa, for example, the mixture having components with greatly differing partial pressures (such as 25 hPa as opposed to 5,000 hPa), at least one mixture component with low partial pressure being replenished at increasingly shorter intervals, and the gas mixture being completely exchanged when a minimal length of the intervals is reached.

Usually such gas mixtures are used in a closed circuit for the operation of gas lasers. In this connection, a typical gas mixture such as is used in an ArF-laser, is formed of 7.5 hPa $F_2$, 350 hPa Ar and 1,700 hPa He, or of 5 to 25hPa $F_2$ with 25 hPa Kr and 5,000 hPa Ne. In this case, $F_2$ together with Ar or Kr, serve to form the laser molecule and He or Ne are generally intended for the stabilization of the discharge.

The service life of such gas mixtures in excimer laser gases is generally limited by two processes. On one hand, even in well passivated systems, a chemical dark reaction takes place between the halogen and the container walls which results in a partial loss of the halogen and leads to an increase in the level of contamination. On the other hand, the unavoidable burn-off of the electrodes also causes chemical reactions. The contamination caused by the burn-off of the electrodes can be in the form of particles as well as volatile metal-fluoride compounds.

In a gas laser, this contamination necessitates increasing the high voltage applied to the discharge gap of the gas laser from, for example, 20 kV to 26 kV in order to keep the output constant. However, such an increase is only possible, permissible and desirable to a limited extent. Therefore each time the permissible voltage is reached, halide and/or active noble gas is admixed to the gas mixture, so that the impact of the contamination is thereby substantially neutralized. However, the amount of gas added is very small in relation to the volume of the closed circuit, so that the pressure in the closed circuit is increased by a value smaller than the exact measuring capability of standard absolute pressure sensors. Accordingly, the added amounts of gas are often conditioned in special small containers separate from the closed circuit, which are then completely emptied into the closed circuit.

Due to the neutralization of the contamination in the gas mixture, the high voltage required for attaining a constant output at first drops rapidly and afterwards slowly increases again because of the continued increase of the absolute amount of the contamination. This increase becomes faster and faster with increasing amounts of contamination so that finally a complete gas exchange in the closed circuit becomes necessary if the gas laser is to continue to be used in a reasonable manner. In this case as well, as stated above, the separate components of the mixture are measured in separate special containers which are then completely emptied into the closed circuit where they create the required gas pressure. However, this method for measuring the separate components of the mixture is comparatively inaccurate and is often not sufficiently variable. Furthermore, at least when supplementing the gas mixture with halide and/or active noble gas, it forces a blind addition, in a manner of speaking, of mixture components to the closed circuit of the gas mixture with respect to the changing total pressure.

It is accordingly an object of the invention to provide a device for the preparation of a gas mixture, which overcomes the hereinafore-mentioned disadvantages of the heretoforeknown devices of this general type, which prepares gas mixtures with greatly differing partial pressures of the several mixture components, and which enables exact measurement of the respective small changes in partial pressure during the admixing of mixture components, even if the partial pressure thereof clearly lies below 1% of the total pressure of the gas mixture.

With the foregoing and other objects in view there is provided, in accordance with the invention, in a device for the preparation of a gas mixture, having a total pressure of 5,000 hPa, for instance, including a closed circuit, especially across the discharge gap of a gas laser, means for feeding mixture components of a gas mixture with greatly differing partial pressures ranging from low to highest partial pressures, such as 25 hPa as opposed to 5,000 hPa, to the closed circuit, means for circulating the gas mixture in the closed circuit, means for replenishing at least one of the mixture components with low partial pressure at increasingly shorter intervals, and means for completely exchanging the gas mixture when a given minimal length of the intervals is reached, the improvement comprising at least one branch parallel to a section of the closed circuit conducting the gas mixture substantially completely free of flow losses, the at least one branch including a magnetic valve, a differential pressure sensor in series with the magnetic valve having a total measuring range corresponding to the low partial pressures, the differential pressure sensor controlling the replenishment of the mixture components having the low partial pressure exclusively while the magnetic valve is closed, and an absolute pressure sensor controlling at least the replenishment of the mixture component having the highest partial pressure.

In accordance with another feature of the invention, the magnetic valve includes a magnetic coil opening the magnetic valve when the magnetic coil is not subjected to current.

In accordance with a further feature of the invention, the the mixture components of the gas mixture include an active laser gas, a halide and a noble carrier gas.

In accordance with an added feature of the invention, the the mixture components of the gas mixture include krypton at 25 hPa, $F_2$ at 5 to 25 hPa, and neon at 5,000 hPa.

In accordance with an additional feature of the invention, the feeding means include electromagnetically operable feed valves each being associated with a respective one of the mixture components, each of the feed valves having a respective magnetic coil closing the feed valve associated therewith when the magnetic coil is not subjected to current.

In accordance with yet another feature of the invention, there is provided a gas laser with a discharge gap connected in the closed circuit for conducting the gas mixture through the discharge gap, the replenishment of the mixture components taking place at intervals during constant output of the gas laser, in dependence on the voltage at the discharge gap.

In accordance with a concomitant feature of the invention, the at least one branch is in the form of a plurality of branches each being connected in parallel with a section of the closed circuit for each mixture component having a partial pressure smaller than one half of the total pressure, magnetic valves each being disposed in a respective one of the branches, and differential pressure sensors each being connected in series with a respective one of the magnetic valves.

The device constructed according to the invention is very advantageous because it assures a systematic replenishment of even the smallest mixture components into a gas mixture under comparatively high gas pressure and it does so efficiently and with a great measure of accuracy and flexibility. The device according to the invention permits manual as well as automatic operation with simple electrical controls so that a great ease of operation as well as a high degree of automation can be attained.

Other features which are considered as characteristic for the invention are set forth in the appended claims.

Although the invention is illustrated and described herein as embodied in a device for the preparation of a gas mixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
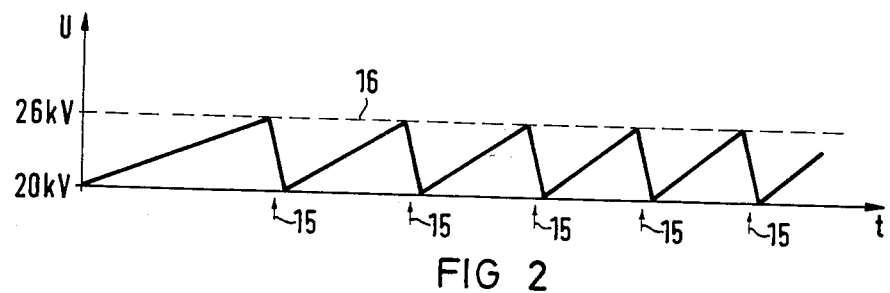

FIG. 1 is a schematic and block circuit diagram of a device according to the invention having a closed circuit for a gas mixture; and FIG. 2 is a graph of the progression in time of the voltage in a gas laser during systematic replenishment of separate components of a gas mixture flowing therethrough.

Referring now to the figures of the drawings in detail and first, particularly, to FIG. 1 thereof, there is seen a recirculating pump 9 which drives a gas mixture through a closed circular pipeline 12, so that the gas mixture successively passes through a gas laser 10 and a gas cooler 11. In the gas laser 10, the discharge gap is simultaneously flushed and continuously filled with fresh gas mixture. During operation of the gas laser 10, the gas mixture is heated and immediately after leaving the gas laser 10 it is cooled down in the gas cooler 11.

Feed valves 4, 5 and 6, which are closed in the no-current condition, are provided for feeding the separate mixture components into the closed circular pipeline 12. In the illustrated embodiment, the feed valve 4 serves for feeding krypton as the active laser gas under a partial pressure of 25 hPa, the feed valve 5 serves for feeding $F_2$ as a halogen with a partial pressure of from 5 to 25 hPa, and the feed valve 6 serves for feeding neon as the noble carrier gas at 5,000 hPa. The feed valves 4 and 5 are controlled in a non-illustrated manner by the outlet of a pressure differential sensor 1 and the feed valve 6 is controlled by the outlet of an absolute pressure sensor 3. The measuring range of the pressure differential sensor 1 corresponds to the lowest partial pressure and the measuring range of the absolute pressure sensor 3 extends at least across the operationally permissible total pressure. The absolute pressure sensor 3 is connected to the closed circular pipeline 12 by a tap line 13. In contrast, the differential pressure sensor 1 is connected to a magnetic valve 2 in a parallel branch 14 which is parallel to an almost flow-loss-free section of the closed circular pipeline 12. The magnetic valve 2 is open in the no current state.

Before operation of the gas laser 10, the closed circular pipeline 12, including the apparatus connected thereto, is evacuated by a vacuum pump 8 through an evacuation valve 7 which is open when under current. After a sufficiently low pressure is reached in the closed circular pipeline 12, the evacuation valve 7 is disconnected from the current and closes. Then the magnetic valve 2 is supplied with voltage and thereby closed and shortly thereafter the feed valve 4 is also supplied with voltage and thereby opened. The krypton serving as the active laser gas thus flows through the feed valve 4 into the closed circular pipeline 12 until the differential pressure sensor 1, which is still connected on one side to an evacuated section of the parallel branch 14 because of the closed magnetic valve 2, reports a pressure increase to 25 hPa. The feed valve 4 is therefore disconnected from the current and closes. Due to these steps, the closed circular pipeline 12, the recirculating pump 9, the gas laser 10, the gas cooler 11 and, because of the subsequent opening of the magnetic valve 2, the entire parallel branch 14 as well, are filled with active laser gas. The differential pressure sensor 1 then again indicates a differential pressure of "zero".

The magnetic valve 2 is then again closed and the feed valve 5 supplied with voltage and is thereby opened, so that fluorine flows into the closed circular pipeline 12 until a preselected differential pressure in the range from 5 to 25 hPa is reported by the differential pressure sensor 1. One after the other, the feed valve 5 is closed and the magnetic valve 2 is opened. The closed circular pipeline 12 and the apparatus connected thereto are thus filled with a mixture of krypton at 25 hPa and fluorine at from 5 to 25 hPa, so that in this point there is a total pressure from 30 to 50 hPa in the closed circular pipeline 12. However, the differential pressure sensor again shows a differential pressure of "zero".

While the magnetic valve 2 remains open, the feed valve 6 is also opened and neon flows into the closed circular pipeline 12 until a total pressure of approximately 5,000 hPa has been reached and the feed valve 6 is closed by a signal given by the absolute pressure sensor 3.

As soon as the recirculating pump 9 forces the gas mixture through the closed circular pipeline 12, the gas laser 10 is ready for operation. However, during operation of the gas laser 10, contamination is unavoidably created and fed into the gas mixture. In order to nevertheless keep the output of the gas laser 10 constant, the voltage applied to the discharge gap thereof must be increased. However, there are limits to this increase. Therefore, when a maximally permissible voltage has been reached, the magnetic valve 2 is closed and the feed valve 4 and/or 5 is briefly opened so that during operation of the gas laser 10 a small amount of krypton and/or fluorine which is exactly measured by the differential pressure sensor 1 flows into the closed circular pipeline 12. The feed valve 4 and/or 5 remains open until the voltage applied to the discharge gap has again fallen to its initial value with the output of the laser remaining constant. The magnetic valve 2 is subsequently opened again as well.

The progress of the voltage required in order to attain a constant output at the discharge gap over time is shown in FIG. 2. Time is plotted on the abscissa and voltage is plotted on ordinate. The abscissa crosses the ordinate at the value corresponding to the initial value of the voltage, for example 20 kV. The maximally permissible value for the voltage, for example 26 kV, is indicated by a broken line 16. The increase in pressure with a fresh gas mixture takes place relatively slowly so that the maximally permissible voltage value is reached, for example, only after an operational time of more than an hour. During the time indicated in FIG. 2 with an arrow 15, the gas mixture in the closed circular pipeline 12 and thus also in the gas laser 10 is replenished with a small amount of fluorine and/or krypton and the voltage again drops to the initial value.

However, since the contamination remains in the gas mixture and accumulates, the time intervals in which the maximally permissible voltage is again reached become ever shorter.

Furthermore, the composition of the gas mixture is changed because of the replenishment of separate gas components. The amounts of gas supplied during the separate replenishment processes have been accurately measured by the differential pressure sensor 1 while the magnetic valve 2 is closed. When preset values for the time interval between two replenishment operations and/or for the change of the composition of the gas mixture have been reached, the gas laser 10 is stopped and the closed circular pipeline 12 is filled with a fresh gas mixture after renewed evacuation.

In case of very sharply differing partial pressures of the active noble gas and the halogen or in the case of an extremely accurate sensing of the separate replenishment amounts, in special cases a differential pressure sensor 1' in series with a magnetic valve 2' is provided in a parallel branch 14' shown by broken lines. The entire measurement range of the differential pressure sensor 1' corresponds, for example, to the smallest partial pressure or to the pressure change during a single replenishment at a time 15.

In order to simplify the electric circuitry of the individual apparatus, in special cases it is practical to provide a parallel branch 14 with a differential pressure sensor 1 and a magnetic valve 2 especially tailored to the partial pressures for each of the individual gases contained in the gas mixture.

The foregoing is a description corresponding in substance to German Application Nos. P 36 33 201.1, dated Sept. 30, 1986, and P 36 34 867.8, dated Oct. 13, 1986, the International priorities of which are being claimed for the instant application, and which is hereby made part of this application. Any material discrepancies between the foregoing specification and the latter aforementioned corresponding German application are to be resolved in favor of the German application.

I claim:

1. In a device for the preparation of a gas mixture including a closed circuit, means for feeding mixture components of a gas mixture with greatly differing partial pressures ranging from low to highest partial pressures to said closed circuit, means for circulating the gas mixture in said closed circuit, means for replenishing at least one of said mixture components with low partial pressure at increasingly shorter intervals, and means for completely exchanging the gas mixture when a given minimal length of the intervals is reached, the improvement comprising at least one branch parallel to a section of said closed circuit conducting the gas mixture substantially completely free of flow losses, said at least one branch including a magnetic valve, a differential pressure sensor in series with said magnetic valve having a total measuring range corresponding to the low partial pressures, said differential pressure sensor controlling the replenishment of the mixture components having the low partial pressure exclusively while said magnetic valve is closed, and an absolute pressure sensor controlling at least the replenishment of the mixture component having the highest partial pressure.

2. A device according to claim 1, wherein said magnetic valve includes a magnetic coil opening said magnetic valve when said magnetic coil is not subjected to current.

3. A device according to claim 1, wherein the mixture components of the gas mixture include an active laser gas, a halide and a noble carrier gas.

4. A device according to claim 1, wherein the mixture components of the gas mixture include krypton at 25 hPa, $F_2$ at 5 to 25 hPa, and neon at 5,000 hPa.

5. A device according to claim 1, wherein said feeding means include electromagnetically operable feed valves each being associated with a respective one of the mixture components, each of said feed valves having a respective magnetic coil closing said feed valve associated therewith when said magnetic coil is not subjected to current.

6. A device according to claim 1, including a gas laser with a discharge gap connected in said closed circuit for conducting the gas mixture through said discharge gap, the replenishment of the mixture components taking place at intervals during constant output of said gas laser, in dependence on the voltage at said discharge gap.

7. A device according to claim 1, wherein said at least one branch is in the form of a plurality of branches each being connected in parallel with a section of said closed circuit for each mixture component having a partial pressure smaller than one half of the total pressure, magnetic valves each being disposed in a respective one of said branches, and differential pressure sensors each being connected in series with a respective one of said magnetic valves.

8. A device for the preparation of a gas mixture, comprising a closed circuit, means for feeding mixture components of a gas mixture with greatly differing partial pressures ranging from low to highest partial pressures to said closed circuit, means for circulating the gas mixture in said closed circuit, at least one branch parallel to a section of said closed circuit conducting the gas mixture substantially completely free of flow losses, said at least one branch including a magnetic valve, a differential pressure sensor in series with said magnetic valve having a total measuring range corresponding to the low partial pressures, said differential pressure sensor controlling the replenishment of the mixture components having the low partial pressure exclusively while said magnetic valve is closed, and an absolute pressure sensor controlling at least the replenishment of the mixture component having the highest partial pressure.

* * * * *